Oct. 5, 1965  J. E. MITCHELL ETAL  3,210,715
QUICK DISCONNECT COUPLING
Filed Jan. 16, 1962  3 Sheets-Sheet 1
FIG.1
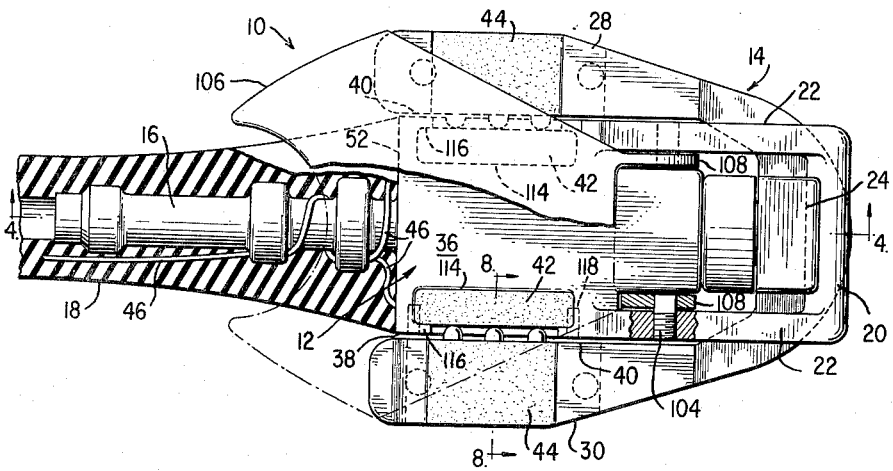
FIG.2
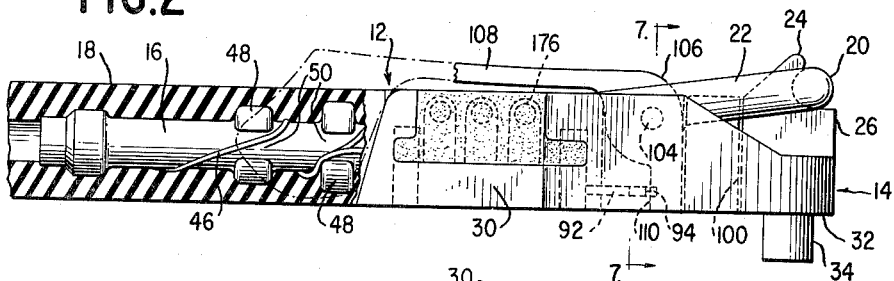
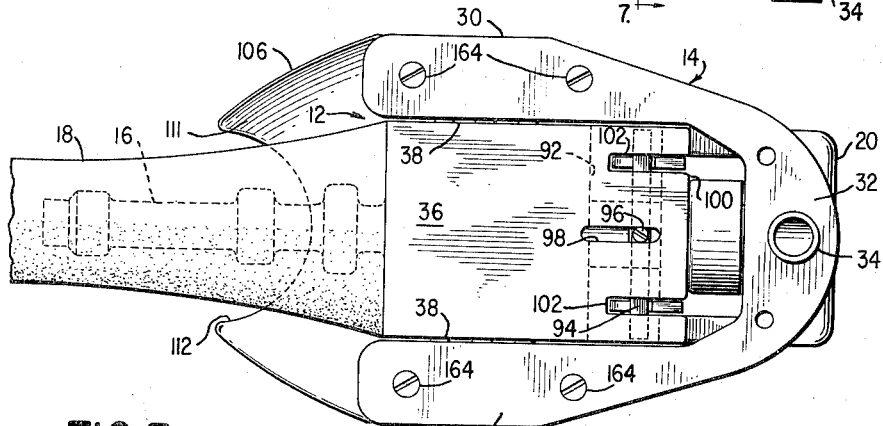
FIG.3
INVENTORS
JOHN E. MITCHELL
BY LLOYD L. BISSING
Mead, Browne, Schuyler & Beveridge
ATTORNEYS Oct. 5, 1965

J. E. MITCHELL ETAL 3,210,715

QUICK DISCONNECT COUPLING

Filed Jan. 16, 1962

INVENTORS
JOHN E. MITCHELL
LLOYD L. BISSING
BY
Mead, Browne, Schuyler & Beveridge
ATTORNEYS Oct. 5, 1965
J. E. MITCHELL ETAL
3,210,715
QUICK DISCONNECT COUPLING
Filed Jan. 16, 1962
3 Sheets-Sheet 3
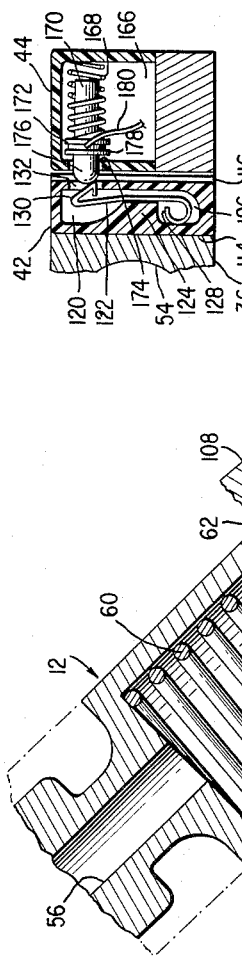
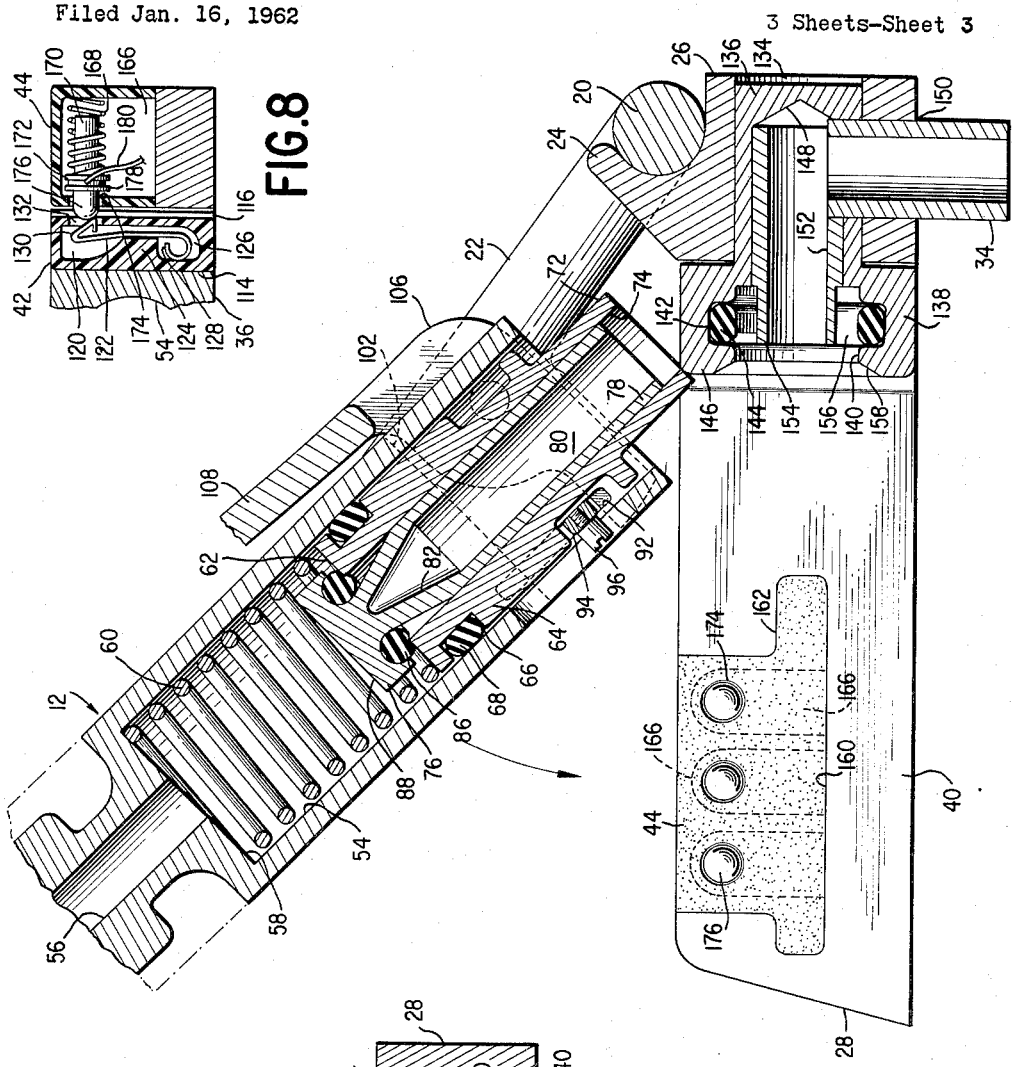
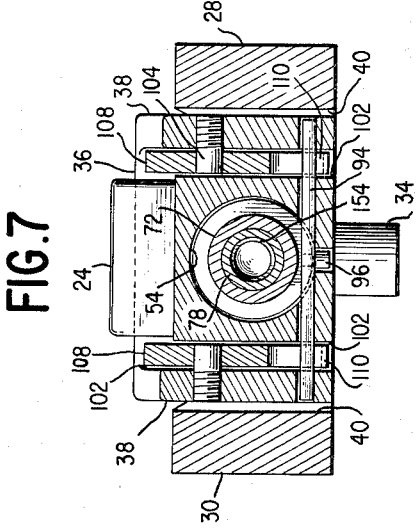
INVENTORS
JOHN E. MITCHELL
LLOYD L. BISSING
BY
Mead, Browne, Schuyler & Beveridge
ATTORNEYS United States Patent Office 3,210,715
Patented Oct. 5, 1965

3,210,715
QUICK DISCONNECT COUPLING
John E. Mitchell and Lloyd L. Bissing, Orange, Calif., assignors to Robertshaw Controls Company, Richmond, Va., a corporation of Delaware
Filed Jan. 16, 1962, Ser. No. 166,565
7 Claims. (Cl. 339—16)

This invention relates to fluid and electrical couplings of the quick-disconnect type in which both gas flow and electrical current can be connected or disconnected instantaneously.

In aircraft adapted to flying at high speeds and extreme altitudes, the pilot must be supplied with oxygen through a flexible conduit to the face mask of the pilot's helmet from a container of oxygen located in the aircraft. Similarly, various electrical connections must be established to the pilot's head set and microphone. Connection and disconnection of the oxygen supply and electrical apparatus from the personal equipment of the pilot must be performed with a minimum of effort. Similar problems arise in hospitals where electrical apparatus is utilized to monitor pulse rate, temperature, blood pressure, cardiac characteristics, etc., of patients who also require oxygen.

Due to the proximity of the electrical connection to the oxygen coupling, the possibility of fire due to arcing as the electrical contacts are separated must be reduced to a minimum. Present couplings of this type do not adequately prevent vibration between the electrical contacts. Moreover, connection and disconnection requires the use of both hands, usually with some visual assistance which is obviously undesirable in emergency situations, and protruding disconnect levers give rise to the possibility of accidental release of the coupling caused by blows, or snagging on environmental structure. The present invention is directed toward providing a coupling free of the above disadvantages.

It is therefore an object of this invention to provide a coupling for fluid flow and electrical circuitry that can be instantaneously connected and disconnected in a single movement without visual assistance.

Another object is to provide a coupling for oxygen flow and electrical circuitry in which the electrical connection is completed before oxygen is permitted to flow and in which oxygen flow is stopped upon disconnection prior to separation of the electrical connection.

Another object is to provide a coupling for electrical circuitry having electrical contacts which are maintained in sliding contact with each other during limited relative movement between the coupling members.

Still another object lies in the provision of a coupling which can be instantaneously connected and disconnected but which is positively locked to reduce the possibility of accidental actuation of the disconnect mechanism.

These and other objects are attained by the provision of a coupling consisting of a supply member for connection with a source of oxygen and electricity, and a delivery member for transmitting electrical current and oxygen to an aviator's helmet or the like. Reciprocally mounted in a chamber in the supply member is a sleeve biased to project from the supply member. Slidably mounted in the sleeve is a pressure responsive check valve which is closed in response to upstream pressure when the members are disconnected. Formed in the delivery member is a socket portion which receives the projecting end of the sleeve when the members are coupled together. Closure of the valve member is prevented when the parts are connected together by an abutment in the socket position. Co-operating elements in the form of a latching bar and hook, together with the seating of the sleeve in the socket portion of the delivery member, serve to firmly latch the parts together. Co-operating side walls on the members are provided with insulated electrical housings, each of which contain electrical contacts biased to project from the housings to engage the opposed contacts from the other member. One of the electrical contacts of each pair is provided with an inclined contact surface so that upon limited relative movement of the coupling members, a sliding electrical contact is maintained between the members. Disconnection is accomplished by actuation of a lever which is pivotally mounted on the supply member and biased to a locked position by engagement with the sleeve. Pivotal movement of the actuating lever to an unlocked position retracts the sleeve from the socket portion of the delivery member and permits the valve to close, whereupon the parts are rotated relative to each other to separate the electrical contacts and disengage the latching bar from the hook.

Further objects and advantages will become apparent from the following description taken in connection with the accompanying drawings wherein:

FIG. 1 is a plan view of the coupling with the members connected;

FIG. 2 is a side view of the coupling shown in FIG. 1;

FIG. 3 is a bottom view of the coupling shown in FIG. 1;

FIG. 6 is a sectional view illustrating the position of the coupling members just prior to connection or after disconnection;

FIG. 7 is a sectional view taken on line 7—7 of FIG. 2; and

FIG. 8 is a sectional view taken along line 8—8 of FIG. 1.

Figure 4:
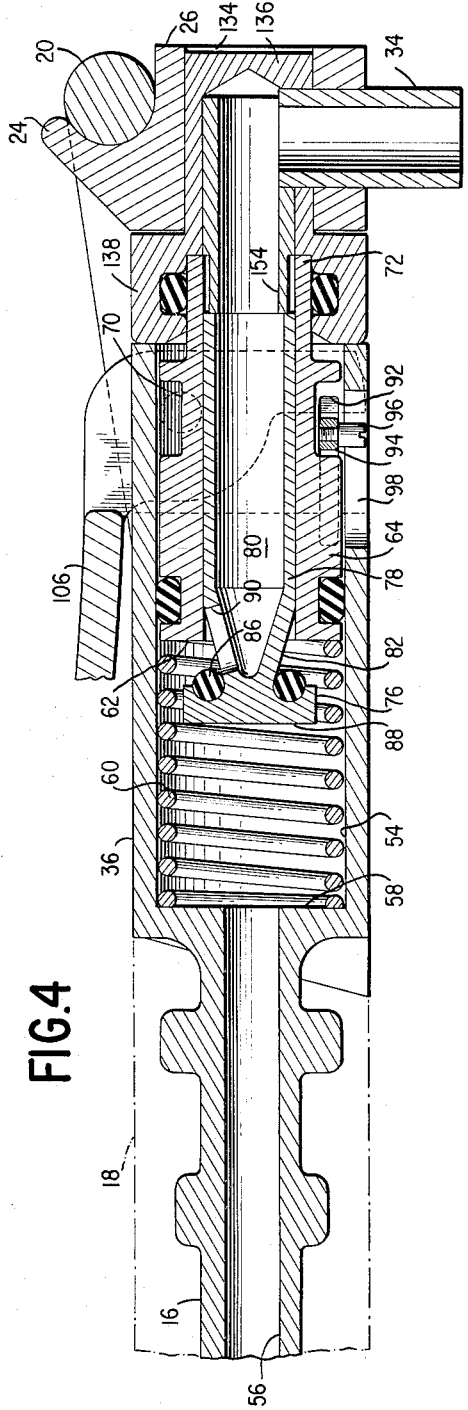
FIG. 4 is a sectional view taken on line 4—4 of FIG. 1.

Referring first to FIGS. 1 through 3, the coupling is indicated generally at 10 and consists of a supply member 12 and a delivery member 14. Extending from supply member 12 is a tubular extension or nipple 16 to which a flexible hose 18 is molded or clamped. Hose 18 is connected to a souce of oxygen. Integrally formed on supply member 12 is a latching bar 20 which is joined to member 12 by a pair of parallel legs 22. Latching bar 20 co-operates with a hook portion 24 on member 14 to pivotally and detachably connect coupling members 12 and 14 in a manner to be described below.

Delivery member 14 comprises a socket portion 26 with a pair of spaced parellel arms 28 and 30 extending from the ends of the socket portion. Extending from the bottom wall 32 of the socket portion 26 is a nipple 34. When the members are connected together as indicated in FIGS. 1 through 3, oxygen flows from hose 18 through passages in members 12 and 14 to nipple 34 and from there to the face mask of an aviator's helmet or the like. When members 12 and 14 are disconnected as shown in FIG. 6, a valve in supply member 12 closes to prevent escape of oxygen from the supply members as will be set forth in detail below.

Supply member 12 comprises a rectangular housing 36 having outer side walls 38, which, when members 12 and 14 are coupled together as shown in FIGS. 1 through 3, are in opposing relationship with inner side walls 40 on arms 28 and 30. Insulated housings 42 and 44 in the opposing walls of members 12 and 14, respectively, are each provided with electrical contacts to close an electrical circuit when the members are coupled together. Lead wires 46 carried by hose 18, and connected to a source of electricity, terminate in housings 42 in electrical connection with the contacts. Nipple 16 is provided with flanges 48 which are formed with guide slots 50. Wires 46 are routed around nipple 16 through slots 50 to eliminate movement of the wires relative to housings 42. Wires 46 enter housings 42 through apertures in the end wall 52 of housing 36.

Referring now to FIGS. 4 through 7, a cylindrical chamber 54 is formed in housing 36 of supply member 12, and communicates with a passage 56 in nipple 16. End wall 58 of chamber 54 provides a seat for one end of a spring 60, the other end of which seats against the forward face 62 of a sleeve member 64 which is slidably received in chamber 54. Formed in the outer wall of sleeve 64 is a circumferential groove 66 which receives an O-ring seal 68 to provide a fluid tight engagement between the walls of sleeve 64 and chamber 54. Sleeve 64 is provided with a second groove 70 spaced longitudinally from groove 66 and an end portion 72 of reduced diameter extends beyond groove 70. Spring 60 biases end portion 72 to extend or project beyond chamber 54 to be received in the socket portion of delivery member 14 locking the members together and providing a continuous passage through the members.

Sleeve 64 defines a passage 74 which slidably receives the tubular stem 78 of a valve 76 which controls fluid flow from hose 18 through supply member 12. Valve 76 connects with tubular stem 78 by means of a tapered wall or neck portion 82. Formed in the inner face of valve 76 is a groove 84 which receives an O-ring 86. Valve 76 is provided with an outer face 88 which is planar in form so that the upstream pressure in chamber 54 from passage 56 acts against plane surface 88 to urge O-ring 86 into engagement with face 62 of sleeve 64 to shut off the flow from chamber 54. One or more apertures 90 are provided in neck portion 82 so that fluid can flow from chamber 54 to the passage 80 defined by stem 78 when valve 76 is in the open position illustrated in FIG. 4.

Housing 36 is provided with a horizontal slot 92 which extends through chamber 54. Slidably mounted in slot 92 is an actuating bar 94 which extends through groove 70 of sleeve 64 and cooperates with the end walls of groove 70 so that movement of bar 94 in slot 92 to the position illustrated in FIG. 5 will retract sleeve 64 into housing 36 against spring 60. Actuating bar 94 is retained laterally in the housing by a screw 96 which cooperates with a longitudinal slot 98 in the bottom wall of housing 36. Mechanism for actuation of bar 94 in slot 92 will now be described.

Formed in housing 36 adjacent its rear wall 100 is a pair of vertical slots 102 extending through the top and bottom walls of the housing and intersecting horizontal slot 92. Pivot pins 104 (FIG. 7) are threaded into the outer wall of housing 36 and extend into slots 102. Pivotally mounted on each pin 104 is a latching lever 106 having a pair of legs 108 which extend in the slots 102, and are apertured for receiving pivot pins 104. Legs 108 extend through horizontal slots 92 and are each provided with a cam surface 110 which engages actuating bar 94 and upon pivotal movement of latching lever 106, actuating bar 94 is moved to the rear of slot 92 and engages the wall of groove 70 to retract sleeve 64. Latching lever 108 extends to a downwardly concave actuating arm 111 (FIG. 3) which closely overlies the coupling members to present a minimum amount of projecting surface thereby minimizing the possibility of snagging on environmental structures. Concave portion 111 is formed with a curved recess 112 for receiving the finger of the operator to actuate the lever. Spring 60, acting through groove 70 of sleeve 64 and actuating bar 94, biases lever 108 to the lock position illustrated in FIGS. 1 through 4.

Formed in the upper and side walls of housing 36 is a pair of recesses 114 (FIGS. 1 and 8) for receiving the insulated electrical housings 42. Flanges 116 extend from side walls 38 to retain housings 42 laterally in the recess. Housings 42 are further retained in recesses 114 by screws 118 in side walls 38 which project into recesses 114 to secure housings 42 in position.

Formed in housings 42 are a plurality of cavities 120 (in this case three). Mounted in each cavity 120 is a resilient contact member 122 of conductive material (FIG. 8). Each cavity 120 has an abutment 124 formed on its inner wall which projects toward the outer wall of the cavity. Abutment 124 defines with the lower wall of cavity 120 a retaining recess 126. Contact member 122 is of the wiper type, and is provided with a curved end portion 128 at the end of the resilient blade which is retained in recess 126 by abutment 124. Formed at the upper end of the contact member 122 is a contact portion 130 having an inclined cam surface which is biased by the engagement of abutment 124 with the resilient stem of the contact member to project through an aperture 132 formed in the outer wall of housing 42 to electrically connect members 12 and 14 together.

Figure 5:
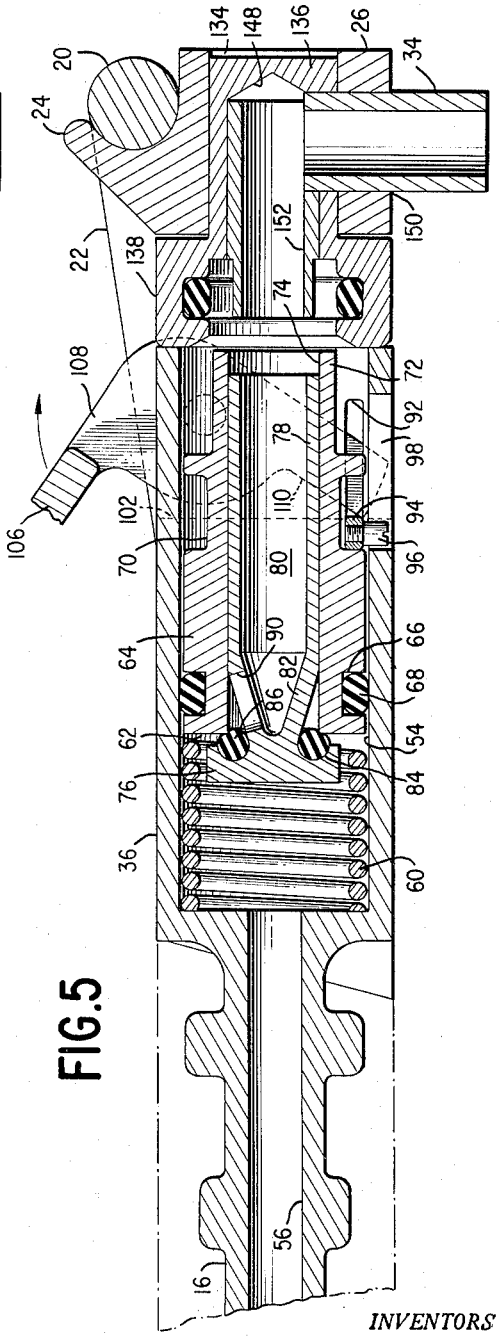
FIG. 5 is a view similar to FIG. 4 with the latching lever in the unlock position just prior to disconnection.

Referring to FIGS. 4, 5 and 6, socket portion 26 of the delivery member 14 is provided with a cylindrical bore 134. Press fitted into bore 134 is the stem 136 of a socket member 138. Socket member 138 is formed with a cavity 140 having an internal annular groove 142 which receives a resilient O-ring 144 for cooperation with the outer surface of sleeve 64 to prevent leakage when members 12 and 14 are connected together. Socket member 138 has an outer face 146 which, together with its rounded edges, serves as a ramp for guiding end portion 72 of sleeve 64 as members 12 and 14 are connected and disconnected.

Communicating with cavity 140 is a bore 148 formed in stem 136. Bore 148 in turn communicates with aperture 150 which is vertically disposed in the drawings and extends through the bottom wall of member 114 and stem 136. Nipple 34 is received in aperture 150 in press fitted engagement therewith. Press fitted into bore 148 is a tubular member 152, the lower portion of which abuts against the shoulder formed by the end of nipple 34 which projects in the bore 148. Thus, a passage for fluid flow is provided from tubular member 152 through nipple 34. Tubular member 152 is provided with an end portion 154, reduced in outer diameter, which projects into cavity 140 and forms with the inner wall of cavity 140 an annular recess 156 which receives end portion 72 of sleeve 64 when members 12 and 14 are connected together. Cavity 140 is preferably chamferred at its outer edge is indicated at 158.

Referring to FIGS. 1 through 3, 6 and 8, arm portions 28 and 30 of delivery member 12 are each provided with recesses 160 for receiving insulating housings 44. Recesses 160 open into inner side walls 40 of arm members 28 and 30. Flanges 162 extend from walls 40 to retain housings 44 laterally, and screws 164 (FIG. 3) secure housing 44 to the member 12.

Formed in each of the housing 44 is a plurality (in this case three) of cavities or chambers 166. Mounted in each cavity 166 is a spring 168. Spring 168 supports a contact member 170 of the plunger type, the spring seating against a flange 172 on member 170 and biasing contact member 170 to project through apertures 174 provided in the outer wall of cavity 166.

Contact plunger 170 is provided with a rounded or hemispherical contact portion 176 which projects through aperture 174 and, when members 12 and 14 are coupled together, engages the inclined surface 130 of contact 122. For limiting the outward movement of contact members 170, a second flange 178 is formed on member 170 to engage the wall of chamber 166 surrounding aperture 174.

Contact member 170 is apertured between flanges 172 and 178 to receive an electrical wire 180 which may be soldered to the contact member. Contact member 170 has a length greater than the distance between the walls of chamber 166 so that its end 176 cannot be retracted past aperture 174 and become jammed against the inner wall of the chamber.

*Operation*

In operation hose 18 is connected with a source of oxygen under pressure and electrical wires 46 are connected with a source of electrical energy. With members 12 and 14 disconnected, fluid pressure in chamber 54 acts against face 88 of valve 76 to urge the O-ring 86 into sealing engagement with the forward face 62 of sleeve 64 (see FIG. 6) to prevent flow of fluid from chamber 54 through the passage 80 when the parts are disconnected. To connect the members 12 and 14 together, latching bar 20 is received by hook 24 and delivery member 12 is pivoted about hook 24 in the direction indicated in FIG. 6. End portion 72 of sleeve 64 is biased by spring 60 to project beyond the end of chamber 54. In the position shown in FIG. 6, end portion 72 engages the outer face 146 of socket member 138 at its upper edge and, as member 12 is pivoted counterclockwise, sleeve 74 is retracted into chamber 54 against the bias of spring 60 by its engagement wtih face 146. When side walls 38 of member 12 reach the position illustrated in FIGS. 1, 3 and 7, they are disposed opposite to the inner side walls 40 of arm portions 30 of the delivery member 12. As soon as this position is obtained, contact members 132 and 170 are in engagement with each other with the end 176 of member 170 being biased into engagement with cam surface 130 of contact member 122. Since both cam surface 130 of contact member 122 and end portion 176 of contact member 170 are both biased outwardly from their respective housings, electrical contact is made before apertures 132 and 174 are brought into complete alignment with each other. Electrical connection is therefore completed before end portion 72 of sleeve 64 becomes disengaged with the chamferred edge 158 of face 146. As soon as member 12 has pivoted to the position illustrated in FIGS. 4 and 5 with passage 80 and 152 coming into axial alignment, spring 60 biases the end portion 72 of sleeve 64 into the annular recess 156 of the socket member as illustrated in FIG. 4.

End portion 154 of tubular member 152 engages the end of valve stem 80 and prevents it from closing against surface 62 of sleeve 64. As soon as portion 72 disengages from chamferred portion 158 and is received in recess 156, oxygen flow begins through the member. However, prior to connection of the oxygen conduits, electrical connection has been completed between plungers 170 and contact 122, and since these members are doubly spring biased, the possibility of sparking has been eliminated.

To connect the members, the operator merely grasps supply member 12 with one hand and engages latching bar 20 in the recess of hook 24. This can be accomplished with a minimum or no visual assistance, and the coupling members are pivoted relative to each other until the end of sleeve 64 is received in recess 156 to securely latch the members in coupled relationship.

To disconnect the members the operator grasps latching lever 106 at recess 112 and pivots latching lever 106 about pins 104 in a clockwise direction as illustrated in FIG. 5. Cam surface 110 of legs 108 engages actuating bar 94 which co-operates with the wall of groove 70 to urge sleeve 64 into chamber 54 against the bias of spring 60, thus retracting end portion 72 from recess 156 in the socket member. As soon as sleeve 64 is retracted from the socket member, face 62 of the sleeve engages O-ring 86 to shut off the flow of oxygen, since the oxygen pressure urges valve 76 closed; and valve stem 80 is no longer in engagement with abutment 154. Thus, the flow of oxygen has stopped prior to disconnection of the electrical contacts. Continual clockwise movement of lever 106 will cause supply member 12 to pivot clock-wise about hook 24 until bar 20 disengages from the hook. The above operation is carried out instantaneously in a single movement.

While a specific embodiment of the invention has been illustrated and described, it will be understood by those skilled in the art that various modifications can be made without departing from the scope of the invention as defined by the appended claims.

What is claimed is:
1. A coupling comprising:
   a pair of members detachably connected,
   opposed side walls and end walls in said members,
   at least one aperture in each of the side walls with the apertures of the opposed walls in registry with each other,
   electrical contacts biased to project through each aperture into engagement with each other to electrically connect the pair of members,
   a recess in an end wall of one of said members,
   a sleeve slidably mounted in the other of said members biased to seat within said recess and provide a continuous passage for fluid flow through said members,
   a normally closed valve slidably mounted within said sleeve for controlling flow through the passage,
   abutment means attached within said recess for maintaining the valve in the other of said members in an open position when the sleeve is seated within the recess,
   and lever means on said other member pivotally operable to retract the sleeve and the valve from the recess to disconnect the members.
2. A coupling as defined in claim 1 including:
   a tubular extension on said other member communicating with said passage for connection with a source of fluid,
   a plurality of flanges on said extension,
   and guide slots formed in the flanges for receiving electrical lead wires.
3. A coupling as defined in claim 1 in which one of the electrical contacts comprises a resilient member having an inclined contact portion projecting from its aperture, and the other of the electrical contacts comprises a plunger member with a rounded contact portion in engagement with the inclined contact portion of said one contact member.
4. In a conduit for fluid and electrical service:
   a delivery member comprising,
      a socket portion,
      a pair of arm portions extending from the ends of the socket portion having opposed inner side walls,
      a plurality of apertures in the opposed side walls,
      electrical contacts in the arm portions projecting through the apertures,
      a cavity formed in the socket portion,
      means defining a passage for fluid flow in the socket portion,
      an abutment in the cavity,
      hook means on the delivery member, and
   a supply member comprising,
      a housing having outer side walls received between the opposed side walls of the delivery member,
      a plurality of apertures in the outer side walls,
      electrical contacts projecting through the apertures into electrical connection with the contacts of the delivery member,
      a chamber in the housing,
      a sleeve slidable in the chamber having an end portion biased to project from the chamber and received in the cavity of said socket portion to form a continuous passage through the supply and delivery members,
      a pressure responsive valve in the sleeve for controlling flow from the chamber through said sleeve, said valve engaged with said abutment in the cavity of the socket member and thereby maintained in an open position against fluid pressure in the chamber,
      a latching lever on the housing biased to a locked position by said sleeve,
      and a latching bar on the housing pivotally and detachably connected to said hook, said latching lever being movable to retract the sleeve from said cavity permitting said valve to close, and said supply member to be rotated about said hook to disconnect the members.

5. The construction defined in claim 4 wherein said latching lever is provided with a concave actuating arm closely overlying the members, said concave actuating arm being manually operable to actuate the latching lever and retract said sleeve from the cavity of said socket portion.

6. A coupling comprising:

a supply member and a delivery member, a latching bar and hook detachably connecting said members, a recess in the delivery member, means in the delivery member defining a passage for fluid flow and extending into the recess to form an abutment, a chamber in the supply member for connection with a source of fluid, a sleeve slidable in the chamber and biased to project from the chamber into said recess forming a continuous passage through the members, a valve having a stem slidable in the sleeve, said valve being urged by upstream fluid in the chamber to a closed position against one end of the sleeve to prevent fluid flow from the chamber through the sleeve, said abutment engaging the valve stem to maintain the valve in an open position, a slot in the supply member, an actuating bar slidably mounted in the slot and engageable with the sleeve, a latching lever pivotally mounted on the supply chamber, said latching lever having at least one leg engageable with the actuating bar and an actuating arm overlying the members, said actuating arm being operable to pivotally move said latching lever and retract the sleeve from said recess permitting disengagement of the latching bar and hook.

7. A coupling as defined in claim 6 including opposed side walls on said members, at least one electrical contact member resiliently biased to project from each of said side walls into electrical engagement with each other, one of said contacts having an inclined contact surface and the other of said contacts having a spherical contact surface, whereby when said members are rotatably connected and disconnected, respectively, said contacts are electrically engaged prior to the opening of said valve and are electrically disengaged subsequent to the closing of said valve.

References Cited by the Examiner
UNITED STATES PATENTS

| | | | |
|---|---|---|---|
| 341,128 | 5/86 | Burton | 339—16 |
| 523,847 | 7/94 | Baker | 339—16 |
| 1,223,222 | 4/17 | Tomlinson | 339—35 XR |
| 1,496,817 | 6/24 | Mather | 339—176 |
| 2,307,393 | 1/43 | Crowley | 339—16 XR |
| 2,857,576 | 10/58 | Ueckert | 339—16 |
| 2,864,628 | 12/58 | Edelson | 137—614.04 |
| 2,956,260 | 10/60 | Bennett | 339—176 |

FOREIGN PATENTS

| | | |
|---|---|---|
| 12,177 | 1911 | Great Britain. |
| 597,460 | 8/25 | France. |

JOSEPH D. SEERS, *Primary Examiner.*

ALBERT H. KAMPE, *Examiner.*